(12) United States Patent
Lu et al.

(10) Patent No.: US 10,310,682 B2
(45) Date of Patent: Jun. 4, 2019

(54) TOUCH DISPLAY PANEL AND FABRICATION METHOD THEREOF

(71) Applicant: Novatek Microelectronics Corp., Hsinchu (TW)

(72) Inventors: Yu-Tsung Lu, Hsinchu (TW); Ching-Chun Lin, New Taipei (TW)

(73) Assignee: Novatek Microelectronics Corp., Hsinchu (TW)

( * ) Notice: Subject to any disclaimer, the term of this patent is extended or adjusted under 35 U.S.C. 154(b) by 43 days.

(21) Appl. No.: 15/132,202

(22) Filed: Apr. 18, 2016

(65) Prior Publication Data
US 2017/0300157 A1    Oct. 19, 2017

(51) Int. Cl.
*G06F 3/045* (2006.01)
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0416* (2013.01); *G06F 2203/04103* (2013.01); *G06F 2203/04105* (2013.01)

(58) Field of Classification Search
CPC ......... G06F 2203/04103; G06F 3/0414; G06F 3/044
See application file for complete search history.

(56) References Cited

U.S. PATENT DOCUMENTS

2016/0092011 A1*   3/2016   Kong ..................... H05K 1/097
                                                              345/174
2016/0103543 A1*   4/2016   Kessler ................. G06F 3/0414
                                                              345/174

* cited by examiner

*Primary Examiner* — Insa Sadio
(74) *Attorney, Agent, or Firm* — JCIPRNET (57) ABSTRACT

A touch display panel includes a top substrate, a bottom substrate, a first pressure sensing electrode, a second pressure sensing electrode and a liquid crystal layer. The top substrate has a color filter layer. The bottom substrate is stacked under the top substrate. The first pressure sensing electrode is disposed on a first surface of the top substrate. The second pressure sensing electrode is disposed on a surface of the bottom substrate. Therein, the first pressure sensing electrode and the second pressure sensing electrode form a pressure sensing capacitor. The liquid crystal layer is disposed between the top substrate and the bottom substrate and disposed between the first pressure sensing electrode and the second pressure sensing electrode.

21 Claims, 9 Drawing Sheets

TOUCH DISPLAY PANEL AND FABRICATION METHOD THEREOF

BACKGROUND

Field of the Invention

The invention relates to a display apparatus, and more particularly to a touch display panel and a fabrication method thereof.

Description of Related Art

Figure 1:
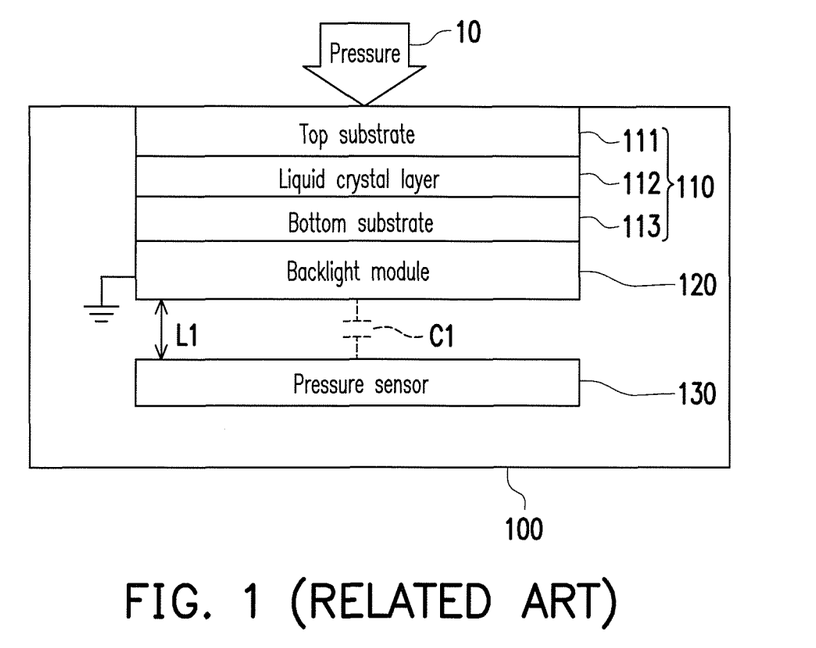
FIG. 1 is a sectional-view diagram of a conventional electronic apparatus with a pressure sensing function.

A touch display panel may be disposed in a mobile electron apparatus for providing a display function and a touch control function. In some products, a pressure sensor may be additionally disposed under the touch display panel for providing a pressure sensing function. FIG. 1 is a sectional-view diagram of a conventional electronic apparatus 100 with a pressure sensing function. The conventional electronic apparatus 100 includes a display panel 110, a backlight module 120 and a pressure sensor 130. The display panel 110 has a top substrate 111, a liquid crystal layer 112 and a bottom substrate 113. The liquid crystal layer 112 is disposed between the top substrate 111 and the bottom substrate 113. The backlight module 120 is stacked under the display panel 110. The backlight module 120 provides a backlight source to the display panel 110, and the liquid crystal display panel 110 displays an image.

The pressure sensor 130 is stacked under the backlight module 120. There is a cell gap (having a distance of an interval L1) between the pressure sensor 130 and the backlight module 120. The backlight module 120 may serve as an electrode plate of a parasitic capacitor C1, and the pressure sensor 130 may serve as another electrode plate of the parasitic capacitor C1. In a situation that a pressure 10 is not yet applied to the display panel 110, the interval L1 between the pressure sensor 130 and the backlight module 120 remains unchanged. When the pressure 10 is applied to the display panel 110, the display panel 110 and the backlight module 120 are deformed, such that the interval L1 becomes smaller (i.e., a capacitance of the parasitic capacitor C1 becomes greater). The pressure sensor 130 senses a change amount of the capacitance of the parasitic capacitor C1. The change amount of the capacitance of the parasitic capacitor C1 may be used to estimate a size of the pressure 10. Because a specific interval L1 (for accommodating the deformation of the backlight module 120) has to be kept between the additionally disposed pressure sensor 130 and the backlight module 120, the thickness of the conventional electronic apparatus 100 is increased due to the additionally disposed pressure sensor 130 and the interval L1.

SUMMARY

The invention provides a touch display panel and a fabrication method thereof capable of integrating a pressure sensing capacitor (i.e., a pressure sensor) in a touch display panel.

According to an embodiment of the invention, a touch display panel is provided. The touch display panel includes a top substrate, a bottom substrate, a first pressure sensing electrode, a second pressure sensing electrode and a liquid crystal layer. The top substrate has a color filter layer. The bottom substrate is stacked under the top substrate. The first pressure sensing electrode is disposed on a first surface of the top substrate. The second pressure sensing electrode is disposed on a surface of the bottom substrate. The first pressure sensing electrode and the second pressure sensing electrode form a pressure sensing capacitor. The liquid crystal layer is disposed between the top substrate and the bottom substrate and disposed between the first pressure sensing electrode and the second pressure sensing electrode.

According to an embodiment of the invention, a fabrication method of a touch display panel is provided. The fabrication method includes: providing a top substrate; disposing a color filter layer on the top substrate; disposing a first pressure sensing electrode on a first surface of the top substrate; providing a bottom substrate; disposing a second pressure sensing electrode on a surface of the bottom substrate; stacking the top substrate above the bottom substrate, wherein the first pressure sensing electrode of the top substrate and the second pressure sensing electrode of the bottom substrate form a pressure sensing capacitor; and disposing a liquid crystal layer between the top substrate and the bottom substrate and between the first pressure sensing electrode and the second pressure sensing electrode.

To sum up, in the touch display panel provided according to the embodiments of the invention, the first pressure sensing electrode is disposed on the top substrate, and the second pressure sensing electrode is disposed on the bottom substrate, respectively, and thereby, the pressure sensing capacitor (i.e., the pressure sensor) can be integrated in the touch display panel.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The term "couple (or connect)" herein (including the claims) are used broadly and encompass direct and indirect connection or coupling means. For example, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. Moreover, elements/components/steps with same reference numerals represent same or similar parts in the drawings and embodiments. Elements/components/steps with the same reference numerals or symbols in different embodiments may be mutually referenced to the related description.

Figure 2:
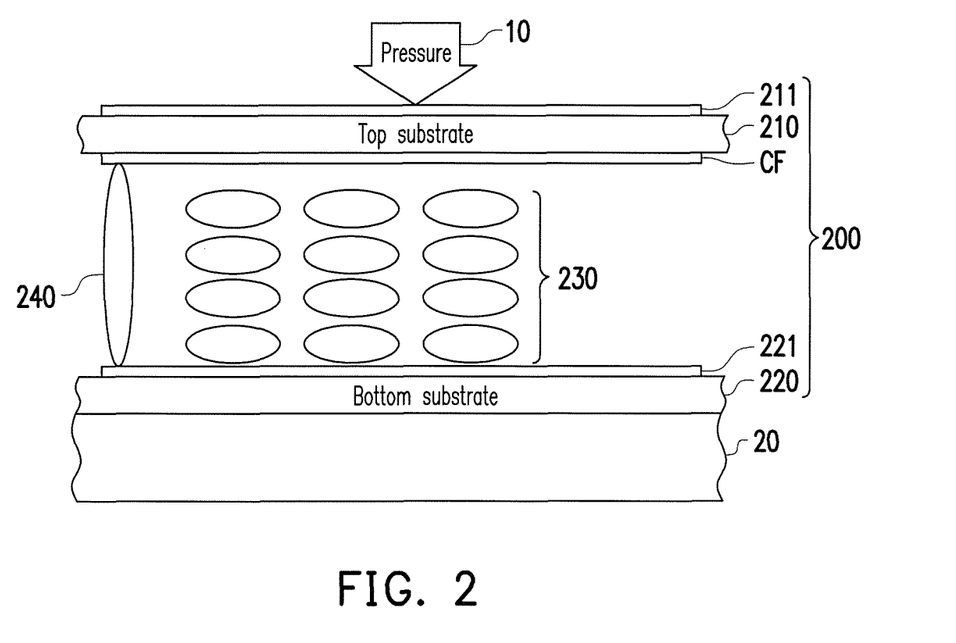
FIG. 2 is a schematic sectional structure diagram of a touch display panel according to an embodiment of the present invention.

FIG. 2 is a schematic sectional structure diagram of a touch display panel 200 according to an embodiment of the present invention. The touch display panel 200 includes a top substrate 210, a bottom substrate 220, a first pressure sensing electrode 211, a second pressure sensing electrode 221 and a liquid crystal layer 230. The first pressure sensing electrode 211 is disposed on a first surface of the top substrate 210. The top substrate 210 has a color filter layer CF. In the embodiment illustrated in FIG. 2, the color filter layer CF is disposed on a second surface of the top substrate 210, and the second surface is different from the first surface disposed with the top substrate 210. The bottom substrate 220 is stacked under the top substrate 210. The second pressure sensing electrode 221 is disposed on a surface of the bottom substrate 220. The first pressure sensing electrode 211 and the second pressure sensing electrode 221 form a pressure sensing capacitor. The liquid crystal layer 230 is disposed between the top substrate 210 and the bottom substrate 220 and disposed between the first pressure sensing electrode 211 and the second pressure sensing electrode 221. A spacer 240 is added between the top substrate 210 and the bottom substrate 220 to keep a cell gap between the two substrates within a predetermined interval.

The touch display panel 200 may further include a pixel circuit (not shown) configured to drive the liquid crystal layer 230, and the pixel circuit may include a thin-film transistor (TFT, not shown), a liquid crystal electrode (not shown) and a common electrode (not shown). The pixel circuit is disposed on the surface of the bottom substrate 220. The pixel circuit 222, the TFT, the liquid crystal electrode and the common electrode may be laid out in a conventional layout structure and will not be repeatedly described. In the embodiment illustrated in FIG. 2, the pixel circuit (including the TFT, the liquid crystal electrode and the common electrode) and the second pressure sensing electrode are disposed in a same conductive layer of the bottom substrate. A backlight module 20 is stacked under the touch display panel 200. The backlight module 20 provides a backlight source to the touch display panel 200, and the touch display panel 200 displays an image.

In a situation that a pressure 10 is not yet applied to the top substrate 210, the interval between the first pressure sensing electrode 211 and the second pressure sensing electrode 221 remains unchanged. When the pressure 10 is applied to the top substrate 210, the top substrate 210 is deformed, such that the interval between the first pressure sensing electrode 211 and the second pressure sensing electrode 221 becomes smaller (i.e., a capacitance of the pressure sensing capacitor formed by the first pressure sensing electrode 211 and the second pressure sensing electrode 221 becomes greater). A pressure sensing circuit (which will be described below) is capable of sensing a change amount of the capacitance of the pressure sensing capacitor formed by the first pressure sensing electrode 211 and the second pressure sensing electrode 221. A size of the pressure 10 may be estimated according to the change amount of the capacitance of the parasitic capacitor.

Figure 3:
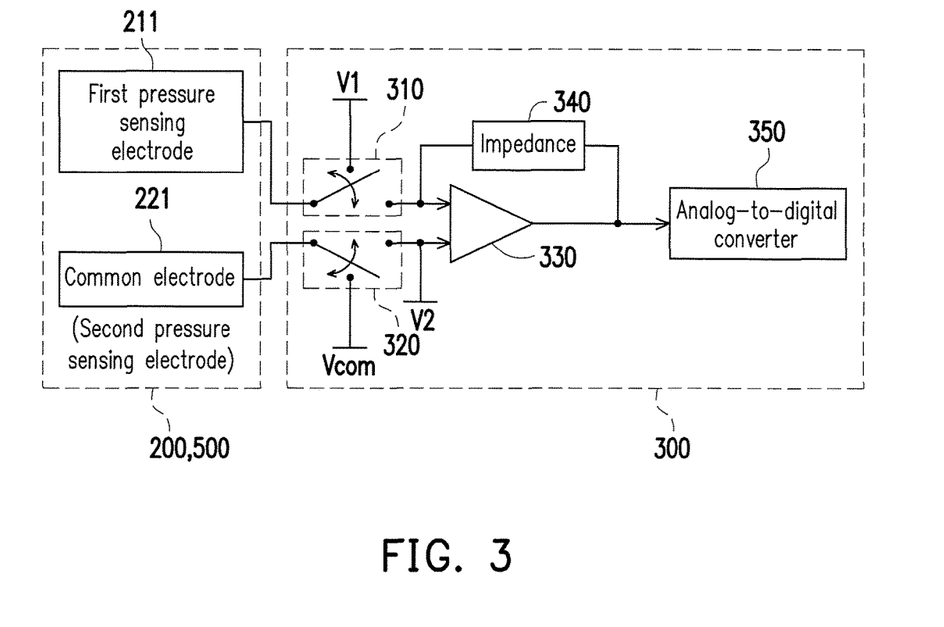
FIG. 3 is a schematic circuit block diagram of a pressure sensing circuit of the touch display panel according to an embodiment of the present invention.

FIG. 3 is a schematic circuit block diagram of a pressure sensing circuit 300 of the touch display panel according to an embodiment of the present invention. In the embodiment illustrated in FIG. 3, the second pressure sensing electrode 221 also functions as a common electrode. Namely, the second pressure sensing electrode 221 may serve as a common electrode of a liquid crystal capacitor of the pixel circuit of the touch display panel. The common electrode may be configured to drive the liquid crystal layer 230, and technical details of driving the liquid crystal layer 230 may refer to conventional liquid crystal driving technique and will not be repeated. Referring to FIG. 2 and FIG. 3, the pressure sensing circuit 300 includes a switch 310, a switch 320, an amplifier 330, an impedance 340 and an analog-to-digital converter (ADC) 350. A first terminal and a second terminal of the impedance 340 are respectively coupled to a first input terminal and an output terminal of the amplifier 330. A second input terminal of the amplifier 330 is coupled to a second voltage V2. A level of the second voltage V2 may be determined based on design requirement. For example, the second voltage V2 may be a ground voltage or any other constant voltage. The output terminal of the amplifier 330 is coupled to an input terminal of the analog digital converter 350.

A common terminal of the switch 310 is coupled to the first pressure sensing electrode 211 of the touch display panel. A first selecting terminal of the switch 310 is coupled to a first voltage V1. A level of the first voltage V1 may be determined based on design requirement. For example, the first voltage V1 may be a ground voltage or any other constant voltage. In other embodiments, the first voltage V1 may be a floating voltage (i.e., having no bias voltage). A second selecting terminal of the switch 310 is coupled to the first input terminal of the amplifier 330. A common terminal of the switch 320 is coupled to the common electrode (i.e., the second pressure sensing electrode 221) of the touch display panel. A first selecting terminal of the switch 320 is coupled to a common voltage Vcom. A level of the common voltage Vcom may be determined based on design requirement. A second selecting terminal of the switch 320 is coupled to the second input terminal of the amplifier 330.

During a display driving period, the first pressure sensing electrode 211 is electrically coupled to the first voltage V1 through the switch 310, and the second pressure sensing electrode 221 is electrically coupled to the common voltage Vcom through the switch 320. In this circumstance, the second pressure sensing electrode 221 serves as the common electrode to drive the liquid crystal layer 230. During a pressure sensing period, the first pressure sensing electrode 211 is electrically coupled to the first input terminal of the amplifier 330 through the switch 310, and the second pressure sensing electrode 221 is electrically couples to the second input terminal of the amplifier 330 through the switch 320. In this circumstance, the amplifier 330 and the impedance 340 read a capacitance of the pressure sensing capacitor formed by the first pressure sensing electrode 211 and the second pressure sensing electrode 221 and output the read result to the ADC 350.

Figure 4:
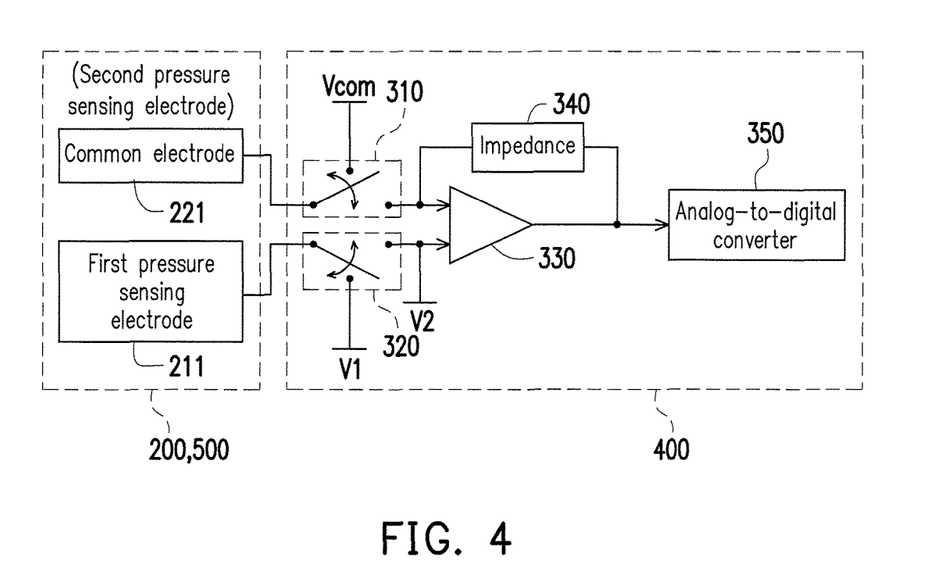
FIG. 4 is a schematic circuit block diagram of a pressure sensing circuit of the touch display panel according to another embodiment of the present invention.

FIG. 4 is a schematic circuit block diagram of a pressure sensing circuit 400 of the touch display panel according to another embodiment of the present invention. In the embodiment illustrated in FIG. 4, the second pressure sensing electrode 221 also functions as a common electrode. The common electrode is configured to drive the liquid crystal layer 230, and technical details of driving the liquid crystal layer 230 may refer to conventional liquid crystal driving technique and will not be repeated. The pressure sensing circuit 400 includes a switch 310, a switch 320, an amplifier 330, a impedance 340 and an ADC 350. Descriptions related to the switch 310, the switch 320, the amplifier 330, the impedance 340 and the ADC 350 illustrated in FIG. 4 may refer to those related to the switch 310, the switch 320, the amplifier 330, the impedance 340 and the ADC 350 illustrated in FIG. 3 and will not be repeated hereinafter.

Referring to FIG. 2 and FIG. 4, a common terminal of the switch 310 is coupled to a common electrode (i.e., the second pressure sensing electrode 221) of the touch display panel. A first selecting terminal of the switch 310 is coupled to a common voltage Vcom. A level of the common voltage Vcom may be determined based on design requirement. A second selecting terminal of the switch 310 is coupled to a first input terminal of the amplifier 330. A common terminal of the switch 320 is coupled to the first pressure sensing electrode 211 of the touch display panel. A first selecting terminal of the switch 320 is coupled to the first voltage V1. A level of the first voltage V1 may be determined based on design requirement. For example, the first voltage V1 may be a ground voltage. In other embodiments, the first voltage V1 may be a floating voltage (i.e., having no bias voltage). A second selecting terminal of the switch 320 is coupled to the second input terminal of the amplifier 330. During a display driving period, the second pressure sensing electrode 221 is electrically coupled to the common voltage Vcom through the switch 310, and the first pressure sensing electrode 211 is electrically coupled to the first voltage V1 through the switch 320. In this circumstance, the second pressure sensing electrode 221 serves as the common electrode to drive the liquid crystal layer 230. During a pressure sensing period, the second pressure sensing electrode 221 is electrically coupled to the first input terminal of the amplifier 330 through the switch 310, and the first pressure sensing electrode 211 is electrically coupled to the second input terminal of the amplifier 330 through the switch 320. In this circumstance, the amplifier 330 and the impedance 340 read a change of a capacitance of the pressure sensing capacitor formed by the first pressure sensing electrode 211 and the second pressure sensing electrode 221 and output the read result to the ADC 350.

Figure 5:
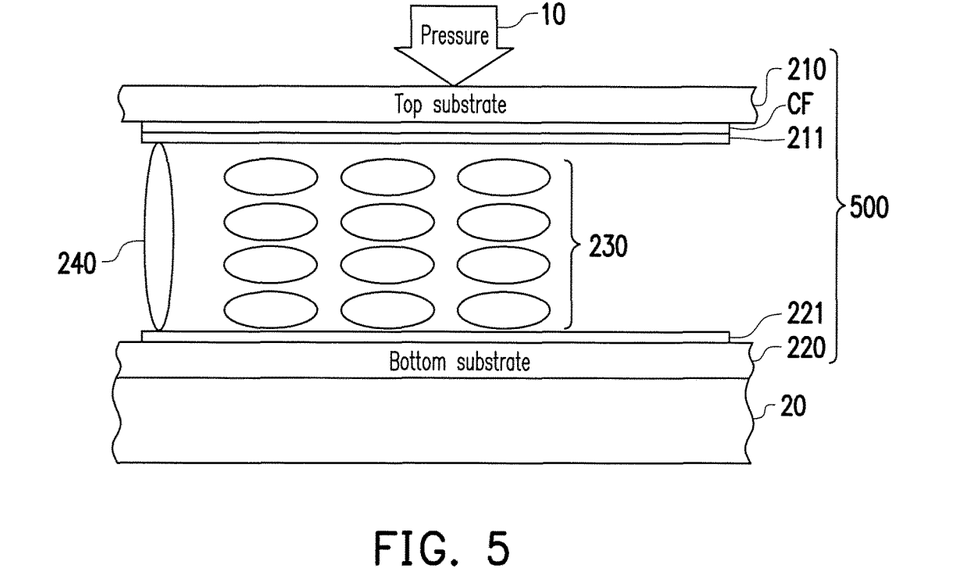
FIG. 5 is a schematic sectional structure diagram of a touch display panel according to another embodiment of the present invention.

FIG. 5 is a schematic sectional structure diagram of a touch display panel 500 according to another embodiment of the present invention. The touch display panel 500 includes a top substrate 210, a bottom substrate 220, a first pressure sensing electrode 211, a second pressure sensing electrode 221, a liquid crystal layer 230, a spacer 240 and a color filter layer CF. Both the color filter layer CF and the first pressure sensing electrode 211 are disposed on a same first surface of the top substrate 210, and the color filter layer CF is disposed between the first pressure sensing electrode 211 and the top substrate 210. In other embodiments, the first pressure sensing electrode 211 may be disposed between the color filter layer CF and the top substrate 210. Descriptions related to the top substrate 210, the bottom substrate 220, the first pressure sensing electrode 211, the second pressure sensing electrode 221, the liquid crystal layer 230, the spacer 240, the color filter layer CF and the backlight module 20 illustrated in FIG. 5 may refer to the top substrate 210, the bottom substrate 220, the first pressure sensing electrode 211, the second pressure sensing electrode 221, the liquid crystal layer 230, the spacer 240, the color filter layer CF and the backlight module 20 illustrated in FIG. 2 and will not be repeated. The pressure sensing circuit 300 illustrated in FIG. 3 and the pressure sensing circuit 400 illustrated in FIG. 4 may also be applied to the touch display panel 500 illustrated in FIG. 5.

Figure 6:
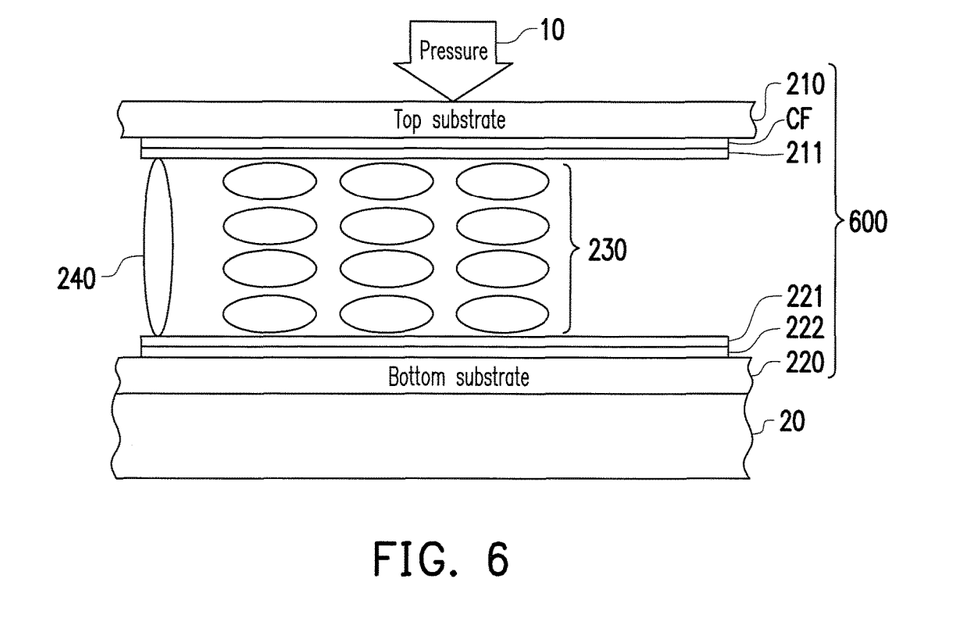
FIG. 6 is a schematic sectional structure diagram of a touch display panel according to yet another embodiment of the present invention.

FIG. 6 is a schematic sectional structure diagram of a touch display panel 600 according to yet another embodiment of the present invention. The touch display panel 600 includes a top substrate 210, a bottom substrate 220, a first pressure sensing electrode 211, a second pressure sensing electrode 221, a liquid crystal layer 230, a spacer 240 and a color filter layer CF. Descriptions related to the top substrate 210, the bottom substrate 220, the first pressure sensing electrode 211, the second pressure sensing electrode 221, the liquid crystal layer 230, the spacer 240, the color filter layer CF and the backlight module 20 illustrated in FIG. 6 may refer to the top substrate 210, the bottom substrate 220, the first pressure sensing electrode 211, the second pressure sensing electrode 221, the liquid crystal layer 230, the spacer 240, the color filter layer CF and the backlight module 20 illustrated in FIG. 5 and will not be repeated.

In the embodiment illustrated in FIG. 6, the touch display panel 600 further includes a pixel circuit 222. The pixel circuit 222 may include a thin-film transistor (TFT, not shown), a liquid crystal electrode (not shown) and a common electrode (not shown). The pixel circuit 222, the TFT, the liquid crystal electrode and the common electrode may be laid out in a conventional layout structure and will not be repeatedly described. The pixel circuit is disposed on a surface of the bottom substrate 220 and configured to drive the liquid crystal layer 230. The pixel circuit 222 is disposed in a first conductive layer of the bottom substrate 220, the second pressure sensing electrode 221 is disposed in a second conductive layer of the bottom substrate 220, and the first conductive layer is between the bottom substrate 220 and the second conductive layer, as illustrated in FIG. 6. In other embodiments, the second pressure sensing electrode 221 is disposed in the first conductive layer of the bottom substrate 220, and the pixel circuit 222 is disposed in the second conductive layer of the bottom substrate 220 (i.e., the second pressure sensing electrode 221 is between the bottom substrate 220 and the pixel circuit 222).

In a situation that the pressure 10 is not yet applied to the top substrate 210, an interval between the first pressure sensing electrode 211 and the second pressure sensing electrode 221 remains unchanged. When the pressure 10 is applied to the top substrate 210, the top substrate 210 is deformed, such that the interval between the first pressure sensing electrode 211 and the second pressure sensing electrode 221 becomes smaller (i.e., a capacitance of the pressure sensing capacitor formed by the first pressure sensing electrode 211 and the second pressure sensing electrode 221 becomes greater). A pressure sensing circuit (which will be described below) is capable of sensing a change amount of the capacitance of the pressure sensing capacitor formed by the first pressure sensing electrode 211 and the second pressure sensing electrode 221. A size of the pressure 10 may be estimated according to the change amount of the capacitance of the parasitic capacitor.

Figure 7:
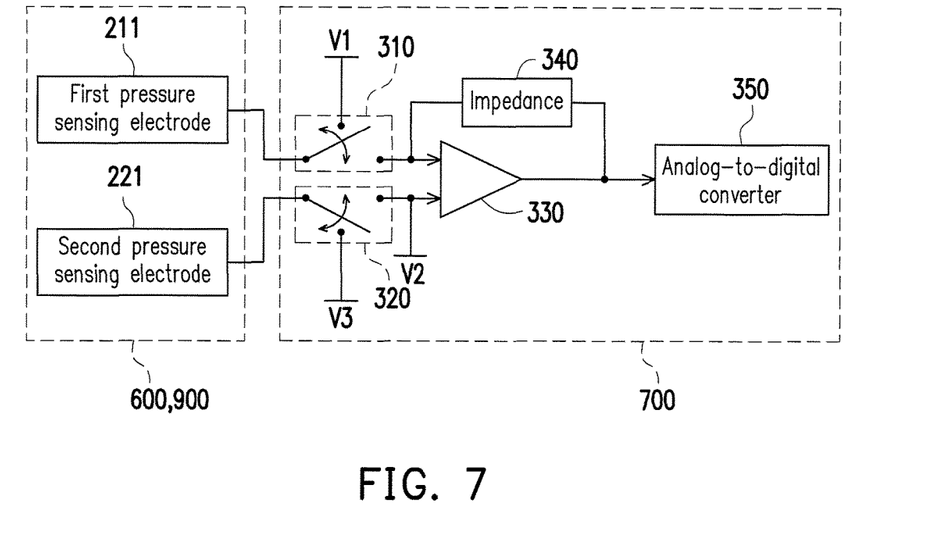
FIG. 7 is a schematic circuit block diagram of a pressure sensing circuit of the touch display panel according to yet another embodiment of the present invention.

FIG. 7 is a schematic circuit block diagram of a pressure sensing circuit 700 of the touch display panel according to yet another embodiment of the present invention. In the embodiment illustrated in FIG. 7, the second pressure sensing electrode 221 does not function as a common electrode. The pressure sensing circuit 700 includes a switch 310, a switch 320, an amplifier 330, an impedance 340 and an ADC 350. Descriptions related to the switch 310, the switch 320, the amplifier 330, the impedance 340 and the ADC 350 illustrated in FIG. 7 may refer to those related to the switch 310, the switch 320, the amplifier 330, the impedance 340 and the ADC 350 illustrated in FIG. 3 and will not be repeated hereinafter.

Referring to FIG. 6 and FIG. 7, a common terminal of the switch 310 is coupled to the first pressure sensing electrode 211 of the touch display panel. A first selecting terminal of the switch 310 is coupled to the first voltage V1. A level of the first voltage V1 may be determined based on design requirement. For example, the first voltage V1 may be a ground voltage or any other constant voltage. In other embodiments, the first voltage V1 may be a floating voltage (i.e., having no bias voltage). A second selecting terminal of the switch 310 is coupled to a first input terminal of the amplifier 330. A common terminal of the switch 320 is coupled to the second pressure sensing electrode 221 of the touch display panel. A first selecting terminal of the switch 320 is coupled to a third voltage V3. A level of the third voltage V3 may be determined based on design requirement. For example, the third voltage V3 may be a ground voltage or any other constant voltage. In other embodiments, the third voltage V3 may be a floating voltage (i.e., having no bias voltage). A second selecting terminal of the switch 320 is coupled to the second input terminal of the amplifier 330.

During a display driving period, the first pressure sensing electrode 211 is electrically coupled to the first voltage V1 through the switch 310, and the second pressure sensing electrode 221 is electrically couples to the third voltage V3 through the switch 320. During a pressure sensing period, the first pressure sensing electrode 211 is electrically coupled to the first input terminal of the amplifier 330 through the switch 310, and the second pressure sensing electrode 221 is electrically coupled to the second input terminal of the amplifier 330 through the switch 320. In this circumstance, the amplifier 330 and the impedance 340 read a change of the capacitance of the pressure sensing capacitor formed by the first pressure sensing electrode 211 and the second pressure sensing electrode 221 and output the read result to the ADC 350.

Figure 8:
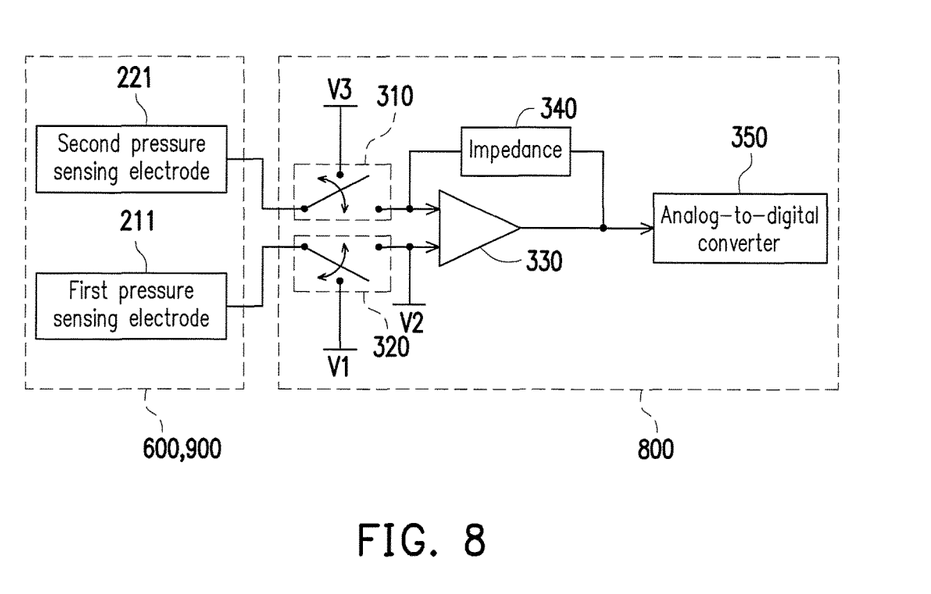
FIG. 8 is a schematic circuit block diagram of a pressure sensing circuit of the touch display panel according to still another embodiment of the present invention.

FIG. 8 is a schematic circuit block diagram of a pressure sensing circuit 800 of the touch display panel according to still another embodiment of the present invention. In the embodiment illustrated in FIG. 8, the second pressure sensing electrode 221 does not function as a common electrode. The pressure sensing circuit 800 includes a switch 310, a switch 320, an amplifier 330, an impedance 340 and an ADC 350. Descriptions related to the switch 310, the switch 320, the amplifier 330, the impedance 340 and the ADC 350 illustrated in FIG. 8 may refer to those related to the switch 310, the switch 320, the amplifier 330, the impedance 340 and the ADC 350 illustrated in FIG. 3 and will not be repeated hereinafter.

Referring to FIG. 6 and FIG. 8, a common terminal of the switch 310 is coupled to the second pressure sensing electrode 221 of the touch display panel. A first selecting terminal of the switch 310 is coupled to a third voltage V3. A level of the third voltage V3 may be determined based on design requirement. For example, the third voltage V3 may be a ground voltage or any other constant voltage. In other embodiments, the third voltage V3 may be a floating voltage (i.e., having no bias voltage). A second selecting terminal of the switch 310 is coupled to a first input terminal of the amplifier 330. A common terminal of the switch 320 is coupled to the first pressure sensing electrode 211 of the touch display panel. A first selecting terminal of the switch 320 is coupled to the first voltage V1. A level of the first voltage V1 may be determined based on design requirement. For example, the first voltage V1 may be a ground voltage or any other constant voltage. In other embodiments, the first voltage V1 may be a floating voltage (i.e., having no bias voltage). A second selecting terminal of the switch 320 is coupled to the second input terminal of the amplifier 330.

During a display driving period, the second pressure sensing electrode 221 is electrically coupled to the third voltage V3 through the switch 310, and the first pressure sensing electrode 211 is electrically coupled to the first voltage V1 through the switch 320. During a pressure sensing period, the second pressure sensing electrode 221 is electrically coupled to the first input terminal of the amplifier 330 through the switch 310, and the first pressure sensing electrode 211 is electrically coupled to the second input terminal of the amplifier 330 through the switch 320. In this circumstance, the amplifier 330 and the impedance 340 read a change of the capacitance of the pressure sensing capacitor formed by the first pressure sensing electrode 211 and the second pressure sensing electrode 221 and output the read result to the ADC 350.

Figure 9:
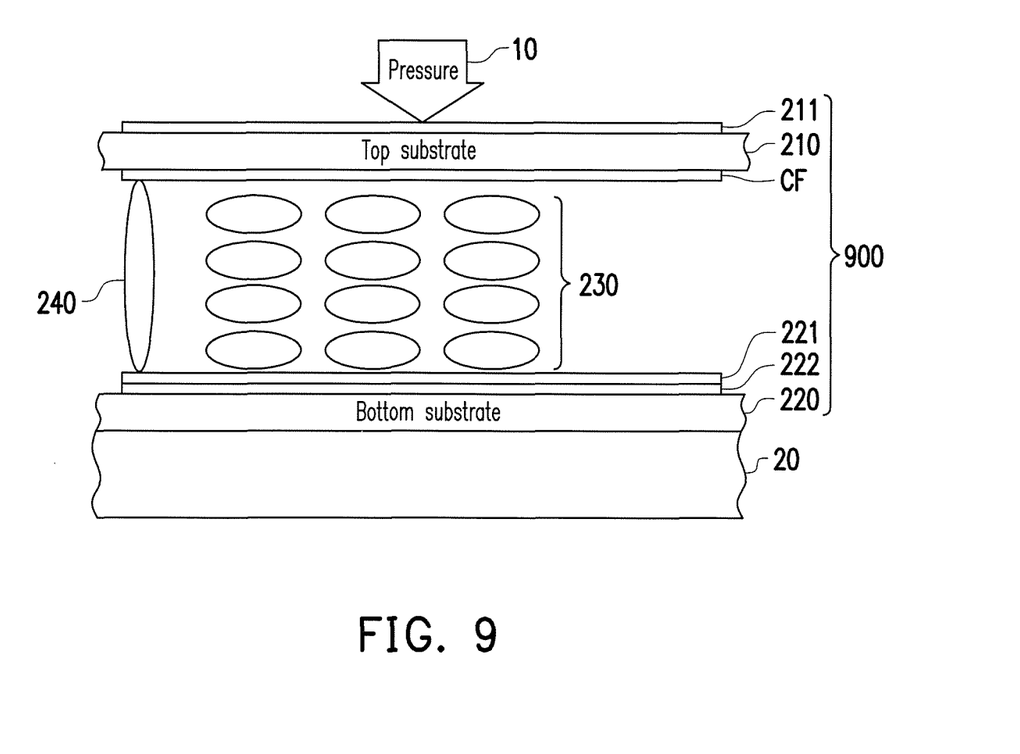
FIG. 9 is a schematic sectional structure diagram of a touch display panel according to still another embodiment of the present invention.

FIG. 9 is a schematic sectional structure diagram of a touch display panel 900 according to still another embodiment of the present invention. The touch display panel 900 includes a top substrate 210, a bottom substrate 220, a first pressure sensing electrode 211, a second pressure sensing electrode 221, a liquid crystal layer 230, a spacer 240 and a color filter layer CF. In the embodiment illustrated in FIG. 9, the first pressure sensing electrode 211 is disposed on a first surface of the top substrate 210, the color filter layer CF is disposed on a second surface of the top substrate 210, and the second surface is different from the first surface. Descriptions related to the top substrate 210, the bottom substrate 220, the first pressure sensing electrode 211, the second pressure sensing electrode 221, the pixel circuit 222, the liquid crystal layer 230, the spacer 240, the color filter layer CF and the backlight module 20 illustrated in FIG. 9 may refer to the top substrate 210, the bottom substrate 220, the first pressure sensing electrode 211, the second pressure sensing electrode 221, the liquid crystal layer 230, the spacer 240, the color filter layer CF and the backlight module 20 illustrated in FIG. 6 and will not be repeated. The pressure sensing circuit 700 illustrated in FIG. 7 and the pressure sensing circuit 800 illustrated in FIG. 8 may also be applied to the touch display panel 900 illustrated in FIG. 9.

Figure 10:
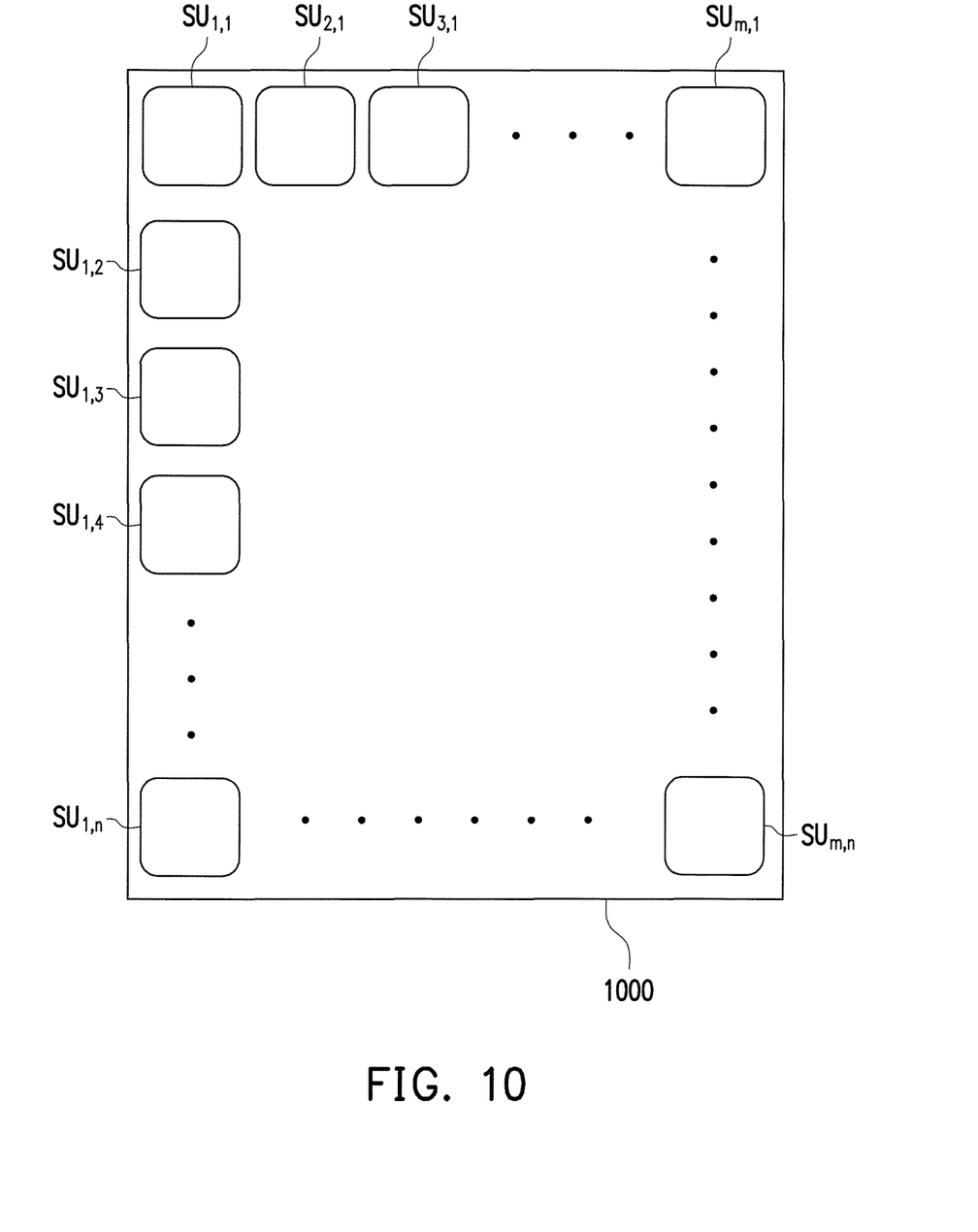
FIG. 10 is a schematic top-view diagram of a layout of a touch display panel according to an embodiment of the present invention.
Figure 11:
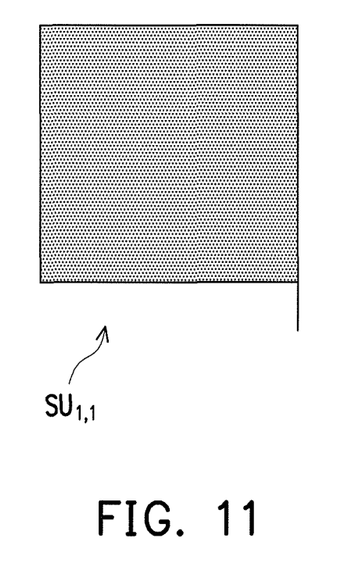
FIG. 11 to FIG. 17 are schematic diagrams of layouts of a pressure sensing electrode of the pressure sensor $SU_{1,1}$ depicted in FIG. 10 in different embodiments.
Figure 12:
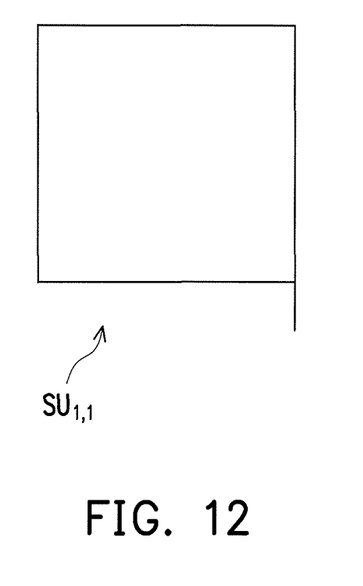
Figure 13:
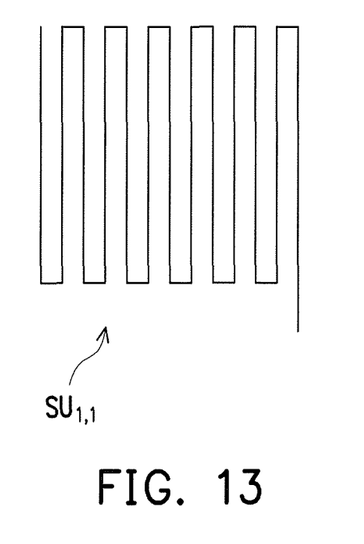
Figure 14:
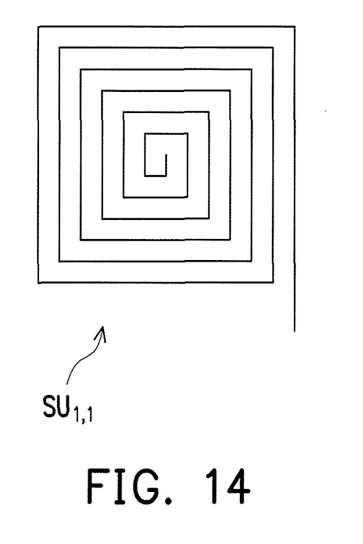
Figure 15:
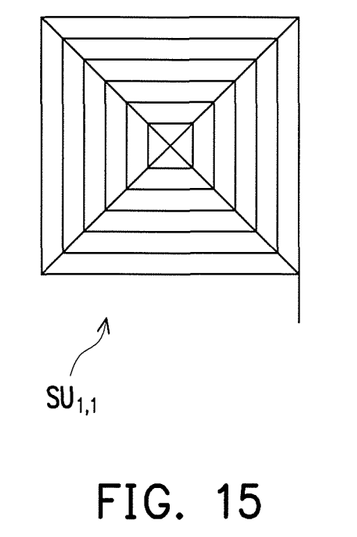
Figure 16:
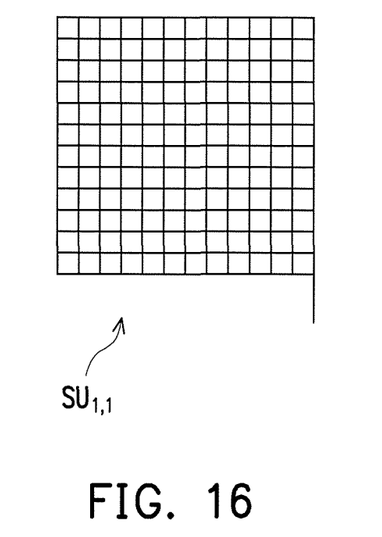
Figure 17:
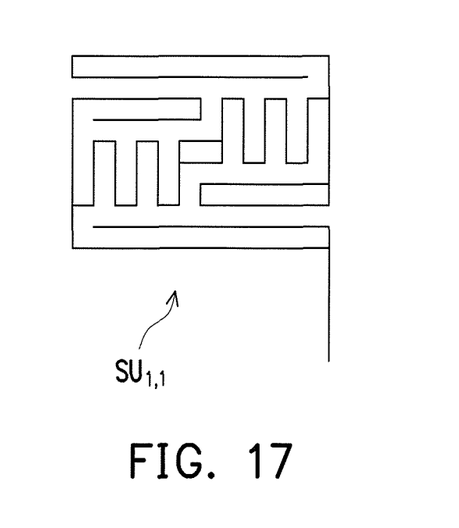

In some embodiments, the first pressure sensing electrode 211 may be disposed on the entire surface of the top substrate 210, and/or the second pressure sensing electrode 221 may be disposed on the entire surface of the bottom substrate 220. In some other embodiments, the touch display panel (e.g., the aforementioned touch display panel 200, 500, 600 or 900) may include a pressure sensor array, and the pressure sensing capacitor formed by the first pressure sensing electrode 211 and the second pressure sensing electrode 221 may be one pressure sensor in the pressure sensor array. For instance, FIG. 10 is a schematic top-view diagram of a layout of a touch display panel 1000 according to an embodiment of the present invention. The touch display panel 200, 500, 600 or 900 may be inferred by analogy according to the description related to the touch display panel 1000 illustrated in FIG. 10. The touch display panel 1000 includes a pressure sensor array including m*n pressure sensors $SU_{1,1}$, $SU_{1,2}$, $SU_{1,3}$, $SU_{1,4}$, ..., $SU_{1,n}$, $SU_{2,1}$, $SU_{3,1}$, $SU_{m,1}$, ... and $SU_{m,n}$. Therein, the pressure sensing capacitor formed by the first pressure sensing electrode 211 and the second pressure sensing electrode 221 (which may refer to the description related to the embodiment illustrated in FIG. 2, FIG. 5, FIG. 6 or FIG. 9 for detail) may be one of the pressure sensors in the pressure sensor array illustrated in FIG. 10.

FIG. 11 to FIG. 17 are schematic diagrams of layouts of a pressure sensing electrode of the pressure sensor $SU_{1,1}$ depicted in FIG. 10 in different embodiments. The other pressure sensors of the pressure sensor array illustrated in FIG. 10 may be inferred by analogy with reference to the description related to the pressure sensor $SU_{1,1}$ and will not be repeatedly described. In the embodiment illustrated in FIG. 11, a layout pattern of the pressure sensing electrode (e.g., the first pressure sensing electrode 211 or the second pressure sensing electrode 221) of the pressure sensor $SU_{1,1}$ is a solid geometric plane. In the embodiment illustrated in FIG. 12, a layout pattern of the pressure sensing electrode (e.g., the first pressure sensing electrode 211 or the second pressure sensing electrode 221) of the pressure sensor $SU_{1,1}$ is a hollow geometric ring. In the embodiment illustrated in FIG. 13, a layout pattern of the pressure sensing electrode (e.g., the first pressure sensing electrode 211 or the second pressure sensing electrode 221) of the pressure sensor $SU_{1,1}$ is a meander line. In the embodiment illustrated in FIG. 14, a layout pattern of the pressure sensing electrode (e.g., the first pressure sensing electrode 211 or the second pressure sensing electrode 221) of the pressure sensor $SU_{1,1}$ is a spiral line. In the embodiment illustrated in FIG. 15, a layout pattern of the pressure sensing electrode (e.g., the first pressure sensing electrode 211 or the second pressure sensing electrode 221) of the pressure sensor $SU_{1,1}$ is a net shape. In the embodiment illustrated in FIG. 16, a layout pattern of the pressure sensing electrode (e.g., the first pressure sensing electrode 211 or the second pressure sensing electrode 221) of the pressure sensor $SU_{1,1}$ is a grid shape. In the embodiment illustrated in FIG. 17, a layout pattern of the pressure sensing electrode (e.g., the first pressure sensing electrode 211 or the second pressure sensing electrode 221) of the pressure sensor $SU_{1,1}$ is another net shape.

Figure 18:
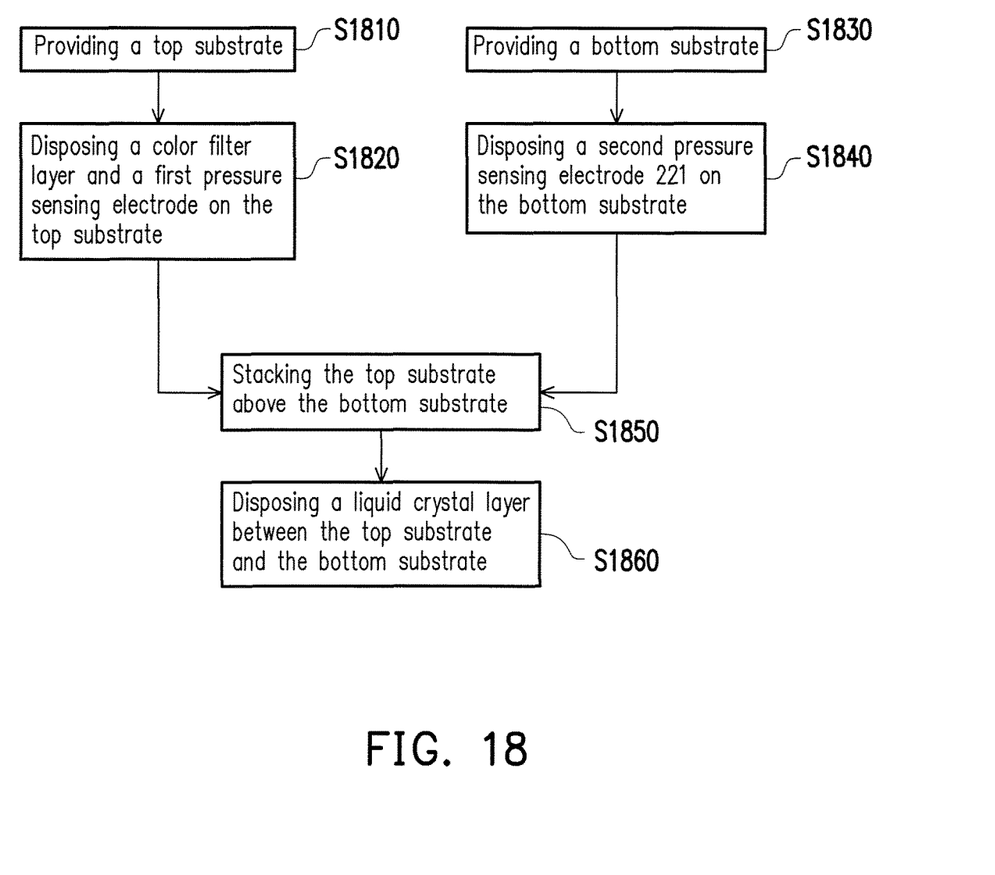
FIG. 18 is a flowchart of a fabrication method of a touch display panel according to an embodiment of the present invention.

FIG. 18 is a flowchart of a fabrication method of a touch display panel according to an embodiment of the present invention. In step S1810, a top substrate 210 is provided. In step S1820, a color filter layer CF and a first pressure sensing electrode 211 are disposed on the top substrate 210. In step S1830, a bottom substrate 220 is provided. In step S1840, a second pressure sensing electrode 221 is disposed on a surface of the bottom substrate 220. In step S1850, the top substrate 210 is stacked above the bottom substrate 220, where the first pressure sensing electrode 211 of the top substrate 210 and the second pressure sensing electrode 221 of the bottom substrate 220 form a pressure sensing capacitor. In step S1860, a liquid crystal layer 230 is disposed between the top substrate 210 and the bottom substrate 220 and between the first pressure sensing electrode 211 and the second pressure sensing electrode 221.

Based on the above, in the touch display panel provided according to the embodiments of the invention, the first pressure sensing electrode and the second pressure sensing electrode are disposed on the top substrate and the bottom substrate, respectively, and thereby, the pressure sensing capacitor (i.e., the pressure sensor) can be integrated in the touch display panel. In comparison with the conventional electronic apparatus 100 illustrated in FIG. 1, the additionally disposed pressure sensor 130 and the interval L1 can be omitted in the touch display panel provided according to each embodiment of the invention.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:

1. A touch display panel, comprising:
   a liquid crystal layer for displaying an image;
   a top substrate of the liquid crystal layer, having a color filter layer;
   a first pressure sensing electrode, disposed on a first surface of the top substrate of the liquid crystal layer;
   a bottom substrate of the liquid crystal layer, stacked under the top substrate, wherein the liquid crystal layer is disposed between the top substrate and the bottom substrate for displaying the image; and
   a second pressure sensing electrode, disposed on a surface of the bottom substrate of the liquid crystal layer, wherein
   the first pressure sensing electrode and the second pressure sensing electrode form a pressure sensing capacitor, and
   the same liquid crystal layer for displaying the image is disposed between the first pressure sensing electrode and the second pressure sensing electrode.

2. The touch display panel according to claim 1, wherein the color filter layer is disposed on a second surface of the top substrate, and the second surface is different from the first surface.

3. The touch display panel according to claim 1, wherein the color filter layer is disposed on the first surface of the top substrate and disposed between the first pressure sensing electrode and the top substrate.

4. The touch display panel according to claim 1, wherein the color filter layer is disposed on the first surface of the top substrate, and the first pressure sensing electrode is disposed between the color filter layer and the top substrate.

5. The touch display panel according to claim 1, wherein the second pressure sensing electrode is a common electrode of a liquid crystal capacitor of a pixel circuit of the touch display panel.

6. The touch display panel according to claim 5, wherein the second pressure sensing electrode is electrically coupled to a common voltage during a display driving period, and the second pressure sensing electrode is electrically coupled to an amplifier during a press sensing period to sense a capacitance of the pressure sensing capacitor.

7. The touch display panel according to claim 1, further comprising:
   a pixel circuit, disposed on the surface of the bottom substrate and configured to drive the liquid crystal layer, wherein the pixel circuit is disposed in a first conductive layer of the bottom substrate, the second pressure sensing electrode is disposed in a second conductive layer of the bottom substrate, and the first conductive layer is between the bottom substrate and the second conductive layer.

8. The touch display panel according to claim 1, further comprising:

a pixel circuit, disposed on the surface of the bottom substrate and configured to drive the liquid crystal layer, wherein the second pressure sensing electrode is disposed in a first conductive layer of the bottom substrate, the pixel circuit is disposed in a second conductive layer of the bottom substrate, and the first conductive layer is between the bottom substrate and the second conductive layer.

9. The touch display panel according to claim 1, further comprising:
a pixel circuit, disposed on the surface of the bottom substrate and configured to drive the liquid crystal layer, wherein the pixel circuit and the second pressure sensing electrode are disposed on a same conductive layer of the bottom substrate.

10. The touch display panel according to claim 1, wherein the touch display panel comprises a pressure sensor array, and the pressure sensing capacitor is one pressure sensor in the pressure sensor array.

11. The touch display panel according to claim 1, wherein a layout pattern of the first pressure sensing electrode or the second pressure sensing electrode is a solid geometric plane, a hollow geometric ring, a meander line, a spiral line, a net shape or a grid shape.

12. A fabrication method of a touch display panel, comprising:
providing a top substrate of a liquid crystal layer;
disposing a color filter layer on the top substrate;
disposing a first pressure sensing electrode on a first surface of the top substrate of the liquid crystal layer;
providing a bottom substrate of the liquid crystal layer;
disposing a second pressure sensing electrode on a surface of the bottom substrate of the liquid crystal layer;
stacking the top substrate above the bottom substrate, wherein the first pressure sensing electrode of the top substrate and the second pressure sensing electrode of the bottom substrate form a pressure sensing capacitor; and
disposing a liquid crystal layer between the top substrate and the bottom substrate for displaying an image, wherein the same liquid crystal layer for displaying the image is disposed between the first pressure sensing electrode and the second pressure sensing electrode.

13. The fabrication method of the touch display panel according to claim 12, wherein the color filter layer is disposed on a second surface of the top substrate, and the second surface is different from the first surface.

14. The fabrication method of the touch display panel according to claim 12, wherein the color filter layer is disposed on the first surface of the top substrate, and disposed between the first pressure sensing electrode and the top substrate.

15. The fabrication method of the touch display panel according to claim 12 wherein the color filter layer is disposed on the first surface of the top substrate, and the first pressure sensing electrode is disposed between the color filter layer and the top substrate.

16. The fabrication method of the touch display panel according to claim 12, wherein the second pressure sensing electrode is a common electrode of a liquid crystal capacitor of a pixel circuit of the touch display panel.

17. The fabrication method of the touch display panel according to claim 12, further comprising:
disposing a pixel circuit on the surface of the bottom substrate, wherein the pixel circuit is configured to drive the liquid crystal layer, the pixel circuit is disposed in a first conductive layer of the bottom substrate, the second pressure sensing electrode is disposed in a second conductive layer of the bottom substrate, and the first conductive layer is between the bottom substrate and the second conductive layer.

18. The fabrication method of the touch display panel according to claim 12, further comprising:
disposing a pixel circuit on the surface of the bottom substrate, wherein the pixel circuit is configured to drive the liquid crystal layer, the second pressure sensing electrode is disposed in a first conductive layer of the bottom substrate, the pixel circuit is disposed in a second conductive layer of the bottom substrate, and the first conductive layer is between the bottom substrate and the second conductive layer.

19. The fabrication method of the touch display panel according to claim 12, further comprising:
disposing a pixel circuit on the surface of the bottom substrate, wherein the pixel circuit is configured to drive the liquid crystal layer, and the pixel circuit and the second pressure sensing electrode are disposed in a same conductive layer of the bottom substrate.

20. The fabrication method of the touch display panel according to claim 12, wherein the touch display panel comprises a pressure sensor array, and the pressure sensing capacitor is one pressure sensor in the pressure sensor array.

21. The fabrication method of the touch display panel according to claim 12, wherein a layout pattern of the first pressure sensing electrode or the second pressure sensing electrode is a solid geometric plane, a hollow geometric ring, a meander line, a spiral line, a net shape or a grid shape.

* * * * *